Patented May 10, 1949

2,469,415

UNITED STATES PATENT OFFICE 2,469,415

HYDROXYARYL ALICYCLIC CARBOXYLIC ACIDS

Erwin Schwenk, Montclair, N. J., and Domenick Papa, Brooklyn, N. Y., assignors to Schering Corporation, Bloomfield, N. J., a corporation of New Jersey No Drawing. Application January 30, 1947, Serial No. 725,266

7 Claims. (Cl. 260—520)

This invention relates to hydroxyaryl alicyclic alkene and alkane carboxylic acids and their metal and amine salts.

A general object of the invention is the production of new compounds suitable for use as chemotherapeutic agents.

We have found that the $\Delta^1$-cycloalkene substituted acetic acids and their homologs and the corresponding isomeric cycloalkylidene carboxylic acids, having in the $\alpha$-position to the carboxylic group either a methylene radical or the group =CH— (in the case of substituted acetic acid), for example cyclohexenyl, cyclohexylidene, cyclopentenyl, cyclopentylidene, dihydronaphthyl and analogous acetic acids, and likewise the members of the acetic acid series substituted by terpene or terpene-like radicals having a double bond connected to the nuclear carbon atom linked to the acid group, can be condensed with an aromatic aldehyde wherein the double bond of the aldehyde group forms part of a conjugated double bond system, for example benzaldehyde, hydroxybenzaldehydes, cinnamaldehyde and hydroxycinnamaldehydes, to form dicyclic alkene carboxylic acids which may be subsequently saturated in the alkene chain and in the cycloalkene ring.

Thus, p-hydroxybenzaldehyde, for example, may be condensed by the Perkin reaction or by modifications of the Perkin reaction, with a salt of cyclohexenyl acetic acid, such as the potassium or sodium salt, under anhydrous conditions in the presence of acetic anhydride, or in the form of the free acid and with the aid of a catalyst, for example, a tertiary amine like triethyl or tributyl amine, and the resulting $\alpha$-$\Delta^1$-cyclohexenyl)-p-hydroxycinnamic acid may be utilized as such or may be hydrogenated, as by means of hydrogen and Raney nickel catalyst, to yield $\alpha$-cyclohexyl-$\beta$-(4-hydroxyphenyl) propionic acid according to the following equation:

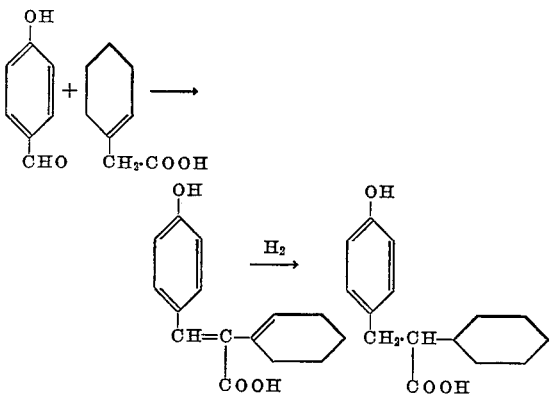

The products of the invention may be represented by the general formula

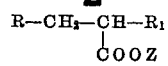

wherein R represents unsubstituted phenyl or hydroxyphenyl and $R_1$ represents unsubstituted cycloalkyl groups or cycloalkyl groups substituted by lower alkyl groups, the cycloalkyl groups containing not less than five and not more than six carbon atoms in the ring, and Z represents hydrogen, alkali metal or alkaline earth metal.

The compounds of the invention, including the analogous compounds embodying heterocyclic rings such as thienyl, pyridyl and furyl, described in our co-pending application Ser. No. 629,916, filed November 20, 1945, have pronounced bactericidal properties particularly against gram negative organisms of the type commonly associated with intestinal infections. In general, the toxicity of the compounds is very low permitting the administration of large quantities of the compounds without any appreciable toxic reactions.

The compounds of the invention are also useful as intermediates for the production, by iodination, of useful amebicidal, bactericidal and X-ray contrast agents as described in our co-pending applications Serial No. 544,832, filed July 13, 1944, now abandoned, Serial No. 629,916, filed November 20, 1945, and Serial No. 722,084, filed Jan. 14, 1947, now abandoned.

EXAMPLE I

$\alpha$-($\Delta^1$-cyclohexenyl) cinnamic acid

A mixture of 17.9 g. of anhydrous potassium-$\Delta^1$-cyclohexenyl acetate and 10.6 g. of benzaldehyde is heated for 15–20 hours at 105° C. with 100 cc. of acetic anhydride. The reaction mixture is then cooled to 60° C. and the excess acetic anhydride cautiously decomposed with water. The reaction mixture is poured on ice and the semisolid residue extracted with ether. The acidic fraction is isolated from the ether by extraction with sodium carbonate solution. On acidification of the sodium carbonate extracts the $\alpha$-($\Delta^1$-cyclohexenyl) cinnamic acid is obtained in the form of a pale yellow solid melting at 150–152° C. On recrystallization from a mixture of acetone and water the acid is obtained in the form of long, white, fine needles, melting at 156–157° C.

By the use of the isomeric anhydrous potassium cyclohexylidene acetate, this condensation yields the same product. It is advisable when using this acid to heat the reaction mixture for a few additional hours in order to secure a comparable yield.

EXAMPLE II

$\alpha$-cyclohexyl-$\beta$-phenyl propionic acid

The $\alpha$($\Delta^1$-cyclohexenyl) cinnamic acid is reduced as follows: 10 g. of the acid are dissolved in 200 cc. of 10% sodium hydroxide. The mixture is heated to 90° C. and, with stirring, 15 g. of Raney nickel aluminum alloy added in the course of about one hour. The mixture is stirred for an additional hour at the same temperature, then filtered by decantation from the nickel, and the nickel washed twice with hot water. On acidification of the filtrate and washings to Congo red paper with concentrated HCl the crude β-phenyl-α-cyclohexyl propionic acid as obtained in a yield of 10 g., melting at 62–65° C. On recrystallization from a mixture of benzene and petroleum ether the reduced acid is obtained as long, fine, white needles melting at 70–71° C.

EXAMPLE III

α-($\Delta^1$-cyclohexenyl)-p-hydroxycinnamic acid
α-cyclohexyl-β-(p-hydroxyphenyl) propionic acid Using either anhydrous potassium-$\Delta^1$-cyclohexenyl acetate or anhydrous potassium cyclohexylidene acetate with p-hydroxybenzaldehyde under the conditions as described in Example I, the α-($\Delta^1$-cyclohexenyl) p-hydroxycinnamic acid is obtained after recrystallization from acetone and water as long, white needles melting at 195–195° C.

When α-($\Delta^1$-cyclohexenyl) p-hydroxycinnamic acid is reduced as described in Example II, a quantitative yield of β-(p-hydroxyphenyl)-α-cyclohexylpropionic acid is obtained. Recrystallized from a mixture of acetone and water the substituted propionic acid is obtained as fine, white needles melting at 180–181° C.

EXAMPLE IV

α-($\Delta^1$-cyclopentenyl)-p-hydroxycinnamic acid
α-cyclopentyl-β-(p-hydroxyphenyl) propionic acid Following the general procedure described for Example I, this acid is obtained by condensing either potassium cyclopentenyl or potassium cyclopentylidene acetate with p-hydroxybenzoldehyde. The product is obtained in the form of white needles which melt at 183° C. with decomposition.

The α-($\Delta^1$-cyclopentenyl) p-hydroxycinnamic acid when reduced as described in Example II yields the α-cylclopentyl-β-(p-hydroxyphenyl) propionic acid which melts at 175–178° C. Recrystallized from acetone and water the product is obtained as white needles melting at 180–181° C.

EXAMPLE V

α-(α-6-methoxy-3,4-dihydronaphthalene)-p-hydroxycinnamic acid
α-(6-methoxytetralyl-1)-β-(p-hydroxyphenyl) propionic acid Using the general procedure described in Example I, 12.8 g. of anhydrous potassium-6-methoxy-1-tetralidene acetate, 6.1 g. of p-hydroxybenzaldehyde and 100 cc. of acetic anhydride are heated for 20 to 25 hours at 105–110° C. The condensation product is isolated by the ether sodium carbonate extraction method, and after several recrystallizations from benzene and petroleum ether it melts at 189–191° C. with decomposition.

Five grams of the above substituted cinnamic acid, when reduced with Raney's alloy and aqueous alkali, yields the α-(6-methoxytetralyl-1)-β-(p-hydroxyphenyl) propionic acid, which melts at 168–174°. Recrystallization from aqueous alcohol gives the acid in the form of fine, white needle smelting at 182–183°.

EXAMPLE VI

The synthesis as outlined in Examples I to V can be modified to avoid the use of the anhydrous alkali salts. This modification uses the free acid, cyclohexenyl, cyclopentenyl, and other alicyclic acetic acids with the appropriate aromatic aldehyde together with suitable catalysts, i. e., triethyl amine, anhydrous sodium or potassium acetate, anhydrous potassium carbonate, etc.

28 g. (0.2 m.) of cyclohexenyl acetic acid, 21.2 g. (0.2 m.) of benzaldehyde, 20.2 g. (0.2 m.) of triethyl amine and 61.2 g. (0.6 m.) of acetic anhydride are heated for 25–30 hours at 100–120° C. The reaction mixture is worked up as described for Example I yielding α($\Delta^1$-cyclohexenyl) cinnamic acid, M. P. 156–157° C.

Substitution of the cyclohexenyl acetic acid by cyclohexylidene acetic acid gives a comparable yield, but requires a few additional hours of heating. Substitution of the triethyl amine by anhydrous potassium acetate likewise gives a good yield in the condensation.

In place of cyclohexenyl acetic acid or of cyclohexylidene acetic acid, and the similarly substituted homologous acids, there may be employed acetic acid and its homologues substituted by cyclohexanol, wherein both the hydroxyl and the acid group are joined to the same nuclear carbon. During the course of the reaction of such a cyclohexanol acetic acid or its ester with an aromatic or heterocyclic aldehyde in the presence of acetic anhydride (or other saturated aliphatic acid anhydride), and of a catalyst like trimethylamine, dehydration of the cyclohexanol acetic acid or ester takes place with the formation of either or both of $\Delta^1$-cyclohexenyl acetic acid and cyclohexylidene acetic acid, or homologous acids or esters. It is desirable to use three molar equivalents of the catalyst.

EXAMPLE VII

α-($\Delta^1$-cyclohexenyl) p-hydroxycinnamic acid

Ninety-three grams (0.5 m.) of ethylcyclohexanol-1 acetate, 61 gm. (0.5 m.) of p-hydroxybenzaldehyde, 150 gm. (1.5 m.) of triethylamine and 300 cc. of acetic anhydride are heated, preferably with stirring, for 25–35 hours at 100–110° C. At the end of the heating period the reaction mixture is cooled to 60° and the excess acetic anhydride cautiously decomposed by the addition of water. The resulting solution is poured into ice and the product extracted with ether. The ether solution is washed free of acetic acid, the ether evaporated, and the resulting residue, which is principally the ester of the condensation product, is saponified with either aqueous or alcoholic alkali. The saponified solution is then treated with carbon dioxide in order to convert the alkali to bicarbonate. After this treatment the solution is heated, treated with charcoal, and filtered. Upon acidification the α-($\Delta^1$-cyclohexenyl) p-hydroxycinnamic acid is precipitated and filtered. The product obtained melts at 191–193° C. after recrystallization from a mixture of acetone and water.

In place of the triethylamine, other organic amines may be used for catalyzing the condensation, as well as metallic salts such as sodium and potassium acetate.

α-(Cyclohexyl)-β-(p-hydroxyphenyl) propionic acid is obtained from α($\Delta^1$-cyclohexenyl)-p-hydroxycinnamic acid by reducing 10 grams of the latter with Raney's alloy and aqueous alkali, as described in the Journal of Organic Chemistry, 9,175 (1944). The substituted propionic acid is isolated in the usual manner and after recrystallization from aqueous acetone melts at 180–181° C.

EXAMPLE VIII

*α-(3,3,5-trimethylcyclohexyl)-β-(p-hydroxyphenyl) propionic acid*

By the usual Reformatsky reaction between trimethylcyclohexanone, ethylbromacetate, zinc, and a mixture of benzene and toluene as solvent, there is obtained the ethyl 3,3,5-trimethylcyclohexanol-1 acetate which boils at 103–104° (C./2 mm. Many variations may be made in this procedure; for example, choice of solvents, type of zinc, etc. We have found that by using granular zinc in a 50–50 mixture of benzene and toluene, good yields of the ethyl trimethylcyclohexanol acetate are obtained.

Saponification of the above ethyl acetate compound with alcoholic sodium hydroxide yields the 3,3,5-trimethylcyclohexanol-1 acetic acid, which, after recrystallization from petroleum ether, melts at 116–117° C.

When the ethyl acetate derivative described above is dehydrated by any of the usual agents, for example, anhydrous HCl, fused potassium bisulfate, etc., there is obtained the unsaturated compound, ethyl 3,3,5-trimethylcyclohexylidene acetate or the ethyl 3,3,5-trimethyl-$\Delta^1$-cyclohexenyl acetate. The type of dehydrating agent used will determine which one of these two isomers is secured. The unsaturated compounds boiled at 76° C./1 mm. When these compounds are saponified with alcoholic sodium hydroxide, there is obtained the 3,3,5-trimethylcyclohexylidene acetic acid or the isomeric $\Delta^1$-3,3,5-trimethylcyclohexenyl acetic acid. One of these products which we have isolated, and which probably is the hexylidene compound, melts at 80–81° C. after recrystallization from petroleum ether.

By condensing 20 gm. of the trimethylcyclohexanol-1 acetic acid with 12 gm. of p-hydroxybenzaldehyde in the presence of 150 cc. of acetic anhydride with 40 cc. of triethylamine as catalyst, there is obtained, after working up the reaction mixture in the normal manner, α-($\Delta^1$-3,3,5-trimethylcyclohexenyl)-p-hydroxycinnamic acid. Satisfactory yields in this reaction are obtained when the reaction mixture described above is heated for a period of 25–35 hours at 100–110° C. The substituted cinnamic acid, after recrystallization from a mixture of methyl alcohol and water, melts at 181–182° C.

The substituted cinnamic acid, when reduced with Raney's alloy and aqueous alkali as mentioned in a previous example, yields the α-(3,3,5-trimethylcyclohexyl)-β-(p-hydroxyphenyl) propionic acid. This substituted propionic acid, after recrystallization from aqueous alcohol, melts at 189–189.5° C.

EXAMPLE IX

*Ethyl (3-methyl-6-isopropylcyclohexanol-1) acetate*

Seventy-five grams of menthone, 80 cc. of ethylbromacetate, 400 cc. of benzene-toluene (1:1), and 33 gm. of granular zinc are reacted in the usual Reformatsky manner. After the reaction is completed, the mixture is worked up in the usual manner, and on distillation there is isolated, after a small forerun of menthone, the methylisopropylcyclohexanol ethyl acetate as a pale yellow oil boiling at 107°/1 mm.

By a series of transformations similar to that described under Example VIII, this cyclohexanol ethyl acetate compound can be converted into the corresponding acids and dicyclic condensation products.

The above-described acids can be converted by the usual reactions into the corresponding salts; for example, the alkali metal salts, such as sodium and potassium, the alkaline earth metal salts, such as those of calcium and magnesium; and the amine salts, like those of mono-, di-, and triethyl amines, dimethylamino ethanol, and the like.

This application is a continuation-in-part of our application Serial No. 544,831, filed July 13, 1944, and contains subject matter in common with our applications Serial No. 544,832, filed July 13, 1944, Serial No. 629,916, filed November 20, 1945, and Serial No. 722,084, filed January 14, 1947.

We claim:

1. Compounds of the general formula

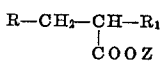

wherein R is selected from the group consisting of unsubstituted phenyl and hydroxyphenyl and R₁ is selected from the group consisting of unsubstituted cycloalkyl groups and cycloalkyl groups substituted by lower alkyl groups, the cycloalkyl groups containing not less than five and not more than six carbon atoms in the ring, and Z is selected from the group consisting of hydrogen, alkali metal and alkaline earth metal.

2. Compounds of the general formula

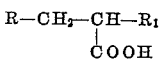

wherein R is a hydroxyphenyl group and R₁ is a cycloalkyl group having not less than five and not more than six carbon atoms in the ring.

3. Compounds of the general formula of claim 2 wherein R is a hydroxyphenyl group and R₁ is a cycloalkyl group having six carbon atoms.

4. Compounds of the general formula of claim 2 wherein R is a hydroxyphenyl group and R₁ is a cycloalkyl group having five carbon atoms.

5. α-cyclohexyl-β-(p-hydroxyphenyl) propionic acid and the alkali and alkaline earth salts thereof.

6. α-cyclopentyl-β-(p-hydroxyphenyl) propionic acid and the alkali and alkaline earth salts thereof.

7. α-(3,3,5-trimethylcyclohexyl)-β-(p-hydroxyphenyl) propionic acid.

ERWIN SCHWENK.
DOMENICK PAPA.

REFERENCES CITED

The following references are of record in the file of this patent:

UNITED STATES PATENTS

| Number | Name | Date |
| --- | --- | --- |
| 2,400,433 | Natelson et al. | May 14, 1946 |

OTHER REFERENCES

Holler et al., Ann. de Chem. et de Phys. (9), vol. 9, page 247 (1918).

McRae et al., Chemical Abstracts, vol. 37, column 4057 (1943), Can. J. Research 21 B, pages 1–12, (1943).

Certificate of Correction

Patent No. 2,469,415.  May 10, 1949.

ERWIN SCHWENK ET AL.

It is hereby certified that error appears in the printed specification of the above-numbered patent requiring correction as follows:

Column 6, line 49, strike out the syllable and words "umn 4057 (1943), Can. J. Research 21 B, pages";

and that the said Letters Patent should be read with this correction therein that the same may conform to the record of the case in the Patent Office.

Signed and sealed this 4th day of October, A. D. 1949.

[SEAL]

THOMAS F. MURPHY,
*Assistant Commissioner of Patents.*